US012578771B2

(12) United States Patent
Chao et al.

(10) Patent No.: US 12,578,771 B2
(45) Date of Patent: Mar. 17, 2026

(54) MULTI-NODE SERVER WITH POWER SCALING

(71) Applicant: Mitac Computing Technology Corporation, Taoyuan City (TW)

(72) Inventors: Hsiu-Te Chao, Taoyuan City (TW); Hsin-Chuan Chang, Taoyuan City (TW)

(73) Assignee: Mitac Computing Technology Corporation, Taoyuan City (TW)

( * ) Notice: Subject to any disclaimer, the term of this patent is extended or adjusted under 35 U.S.C. 154(b) by 78 days.

(21) Appl. No.: 18/810,237

(22) Filed: Aug. 20, 2024

(65) Prior Publication Data

US 2025/0172981 A1    May 29, 2025

(30) Foreign Application Priority Data

Nov. 24, 2023    (TW) .................................. 112145517

(51) Int. Cl.
G06F 1/26        (2006.01)
(52) U.S. Cl.
CPC ..................................... G06F 1/26 (2013.01)
(58) Field of Classification Search
None
See application file for complete search history.

(56) References Cited

U.S. PATENT DOCUMENTS

| | | | | |
|---|---|---|---|---|
| 2012/0306466 | A1* | 12/2012 | Tabuchi ................ | H02M 3/156 |
| | | | | 323/282 |
| 2015/0362982 | A1* | 12/2015 | Yu ............................ | G06F 1/30 |
| | | | | 713/323 |
| 2017/0288537 | A1* | 10/2017 | Jing ........................ | H02M 1/15 |
| 2019/0053341 | A1* | 2/2019 | Stoeger ................. | H05B 45/38 |

* cited by examiner

*Primary Examiner* — Kim Huynh
(74) *Attorney, Agent, or Firm* — MLO, a professional corp.

(57) ABSTRACT

A multi-node server with power scaling includes a power supply unit and a plurality of node motherboards. Each of the node motherboards includes a power switch unit, a protection module, and a processing module. The power switch unit is configured to generate an output voltage based on an operating current received from the power supply unit. The protection module includes a comparator unit and a logic unit. The comparator unit is configured to generate a first logic signal and a second logic signal based on the output voltage, a first reference voltage and a second reference voltage. The logic unit is configured to perform a logical operation based on the first logic signal, the second logic signal, and a setting signal in order to generate a power control signal that switches between a power suppressing logic level and a non-power suppressing logic level.

10 Claims, 5 Drawing Sheets

MULTI-NODE SERVER WITH POWER SCALING

CROSS-REFERENCE TO RELATED APPLICATION

This application claims priority to Taiwanese Invention Patent Application No. 112145517, filed on Nov. 24, 2023, the entire disclosure of which is incorporated by reference herein.

FIELD

The disclosure relates to a server, and more particularly to a multi-node server with power scaling.

BACKGROUND

A conventional single-node server generally has a baseboard management controller (BMC), which is a professional microcontroller embedded in most Intel® server motherboards. The BMC on a motherboard (MB) communicates with a power supply unit (PSU) through a Power Management Bus (PMBus), which is a communication line electrically connecting the MB and the PSU, in order for the BMC to read PSU related information. New central processing unit (CPU) models produced by Intel® mostly support Turbo Boost technology (a technology that increases the CPU operating frequency when a program utilizes more CPU resources, in order to meet computational demands) to enhance the performance of the CPU. However, activating the Turbo Boost may increase power consumption and temperature of the CPU. Consequently, it is required to increase airflow to lower the temperature, which in turn further increases power consumption, and a greater power supply is needed to solve these problems. Therefore, Intel® proposed a new PSU specification that allows the BMC on the MB to adjust an over-current protection point of the PSU through the PMBus to prevent the conventional single-node server from shutting down due to excessive power consumption of the PSU caused by the Turbo Boost activation. This approach allows the conventional single-node server to achieve optimal performance without requiring a greater power supply, but may not be applicable to multi-node servers.

SUMMARY

Therefore, an object of the disclosure is to provide a multi-node server with power scaling that can alleviate at least one of the drawbacks of the prior art.

According to a first aspect of the disclosure, the multi-node server with power scaling includes a power supply unit and a plurality of node motherboards that are electrically connected to the power supply unit. Each of the plurality of node motherboards receives an operating current from the power supply unit, and each of the plurality of node motherboards includes a power switch unit, a protection module, and a processing module.

The power switch unit is electrically connected to the power supply unit for receiving the operating current therefrom, and is configured to generate an output voltage based on the operating current received thereby.

The protection module includes a comparator unit that is electrically connected to the power switch unit for receiving the output voltage therefrom. The comparator unit is configured to divide the output voltage to generate a first voltage and a second voltage. The first voltage is greater than the second voltage. The comparator unit is further configured to generate a first logic signal based on the first voltage and a first reference voltage, and to generate a second logic signal based on the second voltage and a second reference voltage. The protection module further includes a logic unit that is electrically connected to the comparator unit for receiving the first logic signal and the second logic signal therefrom. The logic unit is configured to receive a setting signal, and to perform a logical operation based on the first logic signal, the second logic signal, and the setting signal in order to generate a power control signal that switches between a power suppressing logic level and a non-power suppressing logic level.

The processing module is electrically connected to the power switch unit for receiving the operating current therefrom, and is electrically connected to the logic unit for receiving the power control signal therefrom. The processing module has a power consumption that is positively correlated with the operating current. The processing module is configured to reduce the power consumption of the processing module in order to reduce the operating current when the power consumption of the processing module is so high that the operating current makes the output voltage increase to a level causing the first logic signal, the second logic signal and the setting signal to cooperatively prompt the power control signal received by the processing module to be at the power suppressing logic level.

According to a second aspect of the disclosure, the multi-node server with power scaling includes a power supply unit and a plurality of node motherboards that are electrically connected to the power supply unit. Each of the plurality of node motherboards receives an operating current from the power supply unit, and each of the plurality of node motherboards includes a power switch unit, a processing module, and a protection module.

The power switch unit is electrically connected to the power supply unit for receiving the operating current therefrom. The processing module is electrically connected to the power switch unit for receiving the operating current therefrom. A power consumption of the processing module is positively correlated with the operating current.

The protection module includes a sensing unit that is electrically connected between the power switch unit and the processing module. The sensing unit is configured to sense changes in the operating current and to generate an output voltage that is positively correlated with the operating current. The protection module further includes a determination unit that is electrically connected to the sensing unit for receiving the output voltage therefrom. The determination unit is configured to receive a setting signal, to generate a select voltage based on the output voltage and the setting signal, and to compare the select voltage with a third reference voltage to generate a power control signal. The power control signal switches between a power suppressing logic level and a non-power suppressing logic level.

The determination unit is electrically connected further to the processing module for transmitting the power control signal to the processing module. The processing module is configured to reduce the power consumption of the processing module in order to reduce the operating current when the power consumption of the processing module is so high that the operating current makes the output voltage increase to a level causing the select voltage to prompt the power control signal received from the determination unit to be at the power suppressing logic level.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
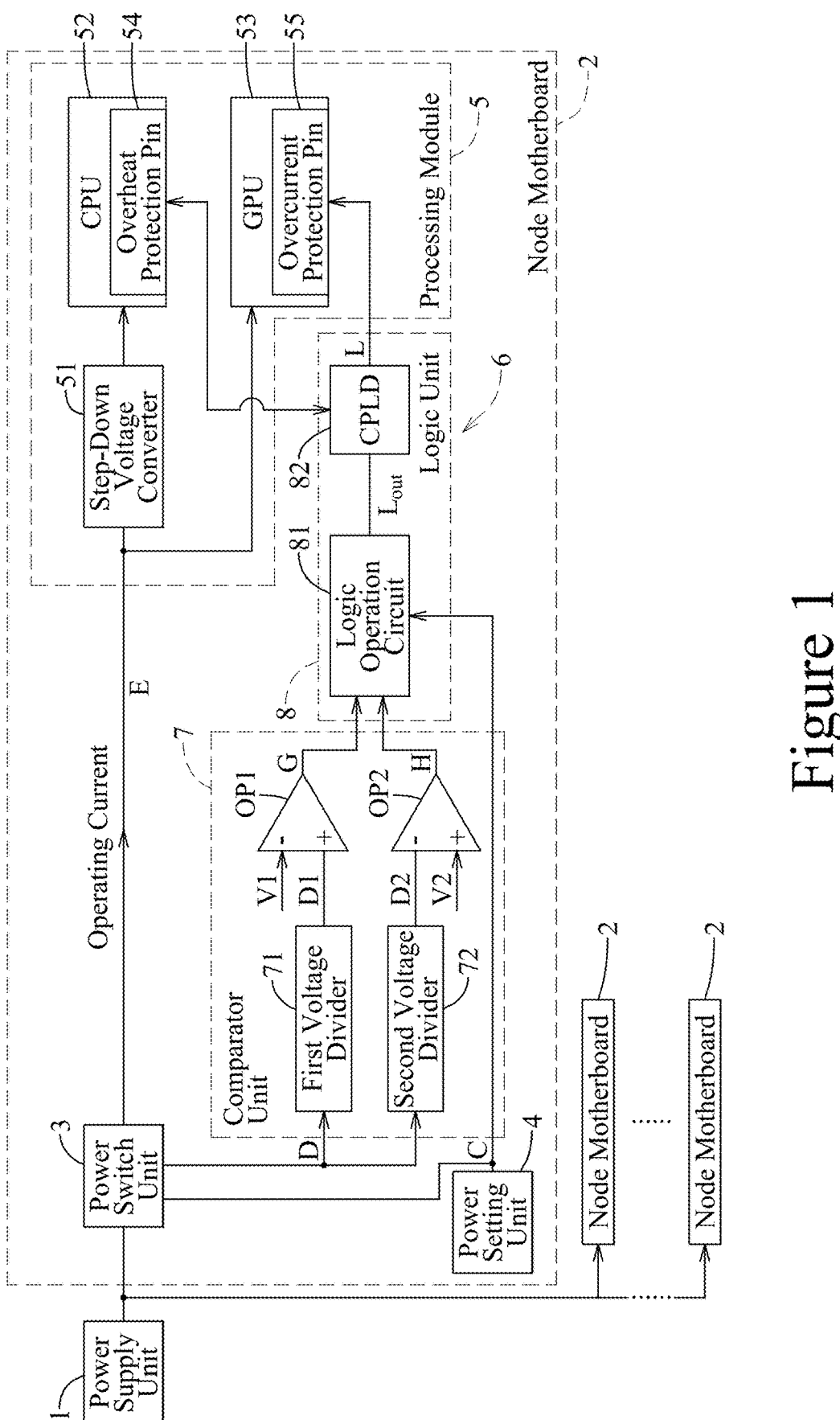
FIG. 1 is a block diagram illustrating a first embodiment of a multi-node server with power scaling according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
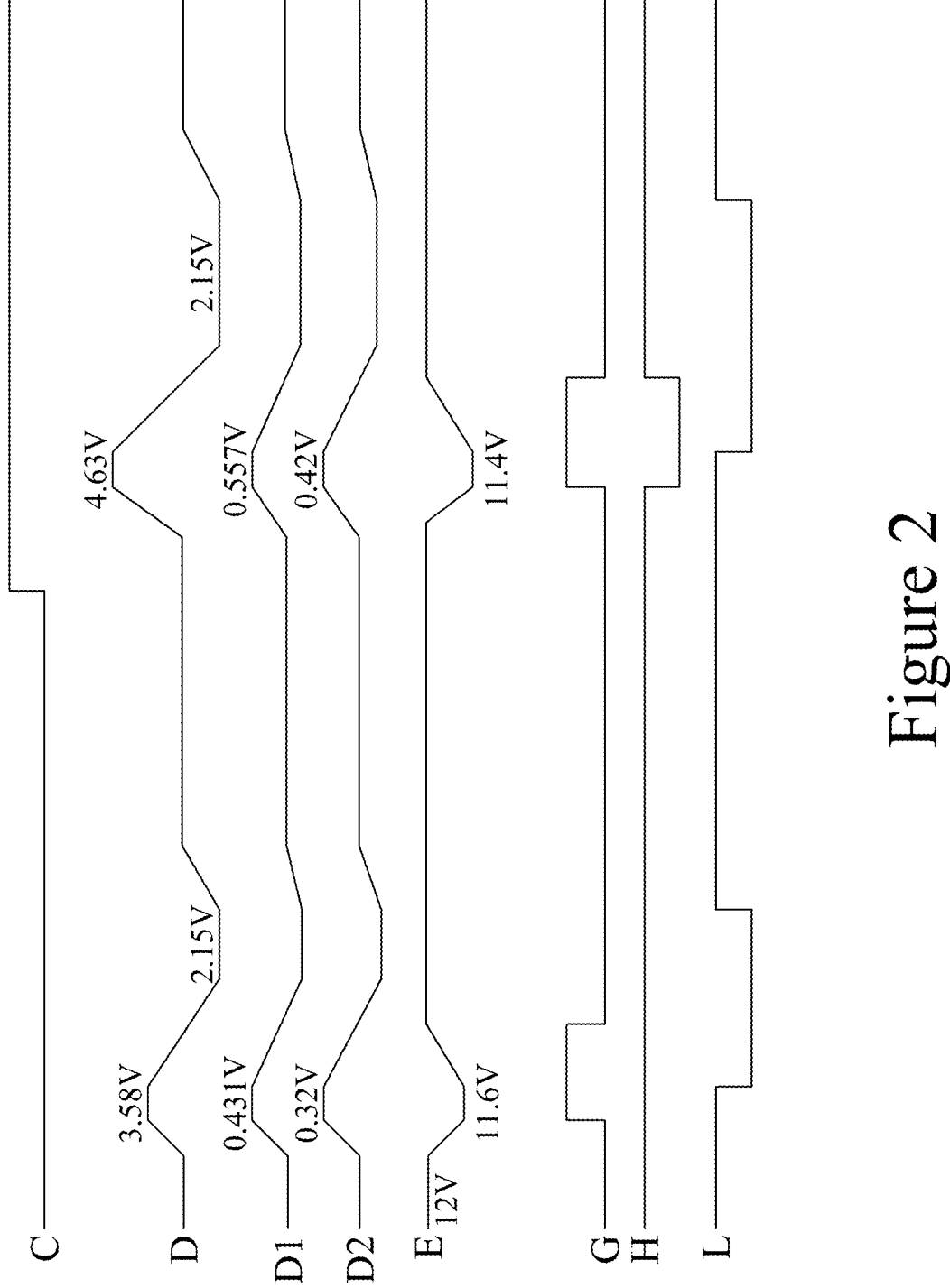
FIG. 2 is a timing diagram of operation of the first embodiment of the multi-node server according to the present disclosure.

Referring to FIGS. 1 and 2, a first embodiment of a multi-node server with power scaling according to this disclosure includes a power supply unit 1 and a plurality of node motherboards 2.

The node motherboards 2 are electrically connected to the power supply unit 1, and each receives an operating current from the power supply unit 1. Each of the node motherboards 2 includes a power switch unit 3, a protection module 6, a processing module 5, and a power setting unit 4. Hereinafter, only one node motherboard 2 will be described in further detail for the sake of brevity.

The power setting unit 4 is configured to generate a setting signal (C) that indicates an upper limit of power to be consumed by the node motherboard 2. For each of the node motherboards 2, the upper limit of power to be consumed by the node motherboard 2 is set to a first power limit when the setting signal (C) is logic 0, and is set to a second power limit that is greater than the first power limit when the setting signal (C) is logic 1. In some embodiments of this disclosure, the first power limit is 500 Watts (W), and the second power limit is 600 W. That is to say, the upper limit of power to be consumed by the node motherboard 2 is 500 W when the setting signal (C) is logic 0, and is 600 W when the setting signal (C) is logic 1.

The power switch unit 3 is electrically connected to the power setting unit 4 for receiving the setting signal (C) therefrom, connected to the power supply unit 1 for receiving the operating current therefrom, and connected to the processing module 5 for transmitting the operating current thus received thereto. The power switch unit 3 is configured to generate an output voltage (D) based on the operating current received thereby. In specific, the power switch unit 3 includes an internal resistor (not shown) that has two opposite ends connected respectively to the power supply unit 1 and the processing module 5, and an operational amplifier (not shown) that has two inputs connected respectively to the two opposite ends of the internal resistor. When the power switch unit 3 receives the operating current from the power supply unit 1 and transmits the operating current thus received to the processing module 5, the operating current passes through the internal resistor and thus produces a potential difference across the internal resistor (hereinafter referred to as "voltage VR" for the sake of brevity). The operational amplifier may cooperate with analog circuits in the power switch unit 3 to convert the voltage VR into the output voltage (D) in such a way that the output voltage (D) is positively correlated with the voltage VR. Hence, the operating current received by the power switch unit 3 from the power supply unit 1 is positively correlated with the output voltage (D) that is generated by the power switch unit 3. The operating current is further positively correlated with a power consumption of the processing module 5. That is to say, as the power consumption of the processing module 5 increases, the operating current that is drawn from the power supply unit 1 via the power switch unit 3 also increases.

Referring to FIGS. 1 and 2, when the setting signal (C) is logic 0 (i.e., the upper limit of power is the first power limit that is 500 W), and the processing module 5 is operating at a normal operating state (i.e., the power consumption of the processing module 5 not reaching the upper limit of power), a supply voltage (E) that is transmitted from the power switch unit 3 to the processing module 5 is 12 volts (V). When the processing module 5 draws more operating currents from the power supply unit 1, causing the power consumption of the processing module 5 to increase, the increase in the operating current passing through the internal resistor of the power switch unit 3 causes the voltage VR to increase. In this embodiment, when the power consumption of the processing module 5 reaches the first power limit, the increased voltage VR causes the supply voltage (E) to drop to 11.6 V, and causes the output voltage (D) to increase from a normal output voltage (i.e., a voltage value of the output voltage (D) when the processing module 5 is operating at the normal operating state) to 3.58 V (i.e., the voltage value of the output voltage (D) when the processing module 5 is operating at the first power limit). In this embodiment, when the setting signal (C) is logic 0, the normal output voltage is defined as being between 2.15 V and 3.58 V. When the setting signal (C) is logic 1 (i.e., the upper limit of power is the second power limit that is 600 W), and the processing module 5 is operating at the normal operating state, the supply voltage (E) that is transmitted from the power switch unit 3 to the processing module 5 is 12 V. When the power consumption of the processing module 5 increases, the operating current drawn from the power supply unit 1 increases, causing the voltage VR of the power switch unit 3 to increase. When the power consumption of the processing module 5 reaches the second power limit, the increased VR causes the supply voltage (E) to drop to 11.4 V, and causes the output voltage (D) to increase from the normal output voltage to 4.63 V (i.e., the voltage value of the output voltage (D) when the processing module 5 is operating at the second power limit). When setting signal (C) is logic 1, the normal output voltage is defined as being between 2.15 V to 4.63 V.

The protection module 6 includes a comparator unit 7 and a logic unit 8. The comparator unit 7 is electrically connected to the power switch unit 3 for receiving the output voltage (D) therefrom, and is configured to divide the output voltage (D) to generate a first voltage (D1) and a second voltage (D2), where the first voltage (D1) is greater than the second voltage (D2). The comparator unit 7 is further configured to generate a first logic signal (G) based on the first voltage (D1) and a first reference voltage (V1), and to generate a second logic signal (H) based on the second voltage (D2) and a second reference voltage (V2). In this embodiment, the first reference voltage (V1) is equal to the second reference voltage (V2). The logic unit 8 is electrically connected to the comparator unit 7 for receiving the first logic signal (G) and the second logic signal (H) therefrom. The logic unit 8 is configured to receive the setting signal (C) and to perform a logical operation based on the first logic signal (G), the second logic signal (H), and the setting signal (C) in order to generate a power control signal (L) that switches between a power suppressing logic level and a non-power suppressing logic level. In this embodiment, the power suppressing logic level is logic 0, and the non-power suppressing logic level is logic 1.

The comparator unit 7 includes a first voltage divider 71 that is configured to divide the output voltage (D) to generate the first voltage (D1), and a first comparator (OP1). The first comparator (OP1) has a non-inverting input electrically connected to the first voltage divider 71 for receiving the first voltage (D1), an inverting input for receiving the first reference voltage (V1), and an output for outputting the first logic signal (G). In specific, the first logic signal (G) is logic 1 when the first voltage (D1) is greater than the first reference voltage (V1), and the first logic signal (G) is logic 0 when the first voltage (D1) is smaller than the first reference voltage (V1). The comparator unit 7 further includes a second voltage divider 72 that is configured to divide the output voltage (D) to generate the second voltage (D2), and a second comparator (OP2). The second comparator (OP2) has an inverting input electrically connected to the second voltage divider 72 for receiving the second voltage (D2), a non-inverting input for receiving the second reference voltage (V2), and an output for outputting the second logic signal (H). In specific, the second logic signal (H) is logic 0 when the second voltage (D2) is greater than the second reference voltage (V2), and the second logic signal (H) is logic 1 when the second voltage (D2) is smaller than the second reference voltage (V2).

The logic unit 8 includes a logic operation circuit 81 and a complex programmable logic device (CPLD) 82. The logic operation circuit 81 is electrically connected to the power setting unit 4 for receiving the setting signal (C) therefrom, connected to the first comparator (OP1) for receiving the first logic signal (G), and connected to the second comparator (OP2) for receiving the second logic signal (H). The logic operation circuit 81 is configured to generate a logic output signal $(L_{out})$ according to: $L_{out}$=H & !(G & !C), where the parameter "$L_{out}$" in this equation represents a logic level of the logic output signal $(L_{out})$, the parameter "G" in this equation represents a logic level of the first logic signal (G), the parameter "H" in this equation represents a logic level of the second logic signal (H), the parameter "C" represents a logic level of the setting signal (C), the symbol "!" denotes a NOT operation, and the symbol "&" denotes an AND operation. In this embodiment, when the setting signal (C) is logic 0, the logic output signal $(L_{out})$ switches to logic 0 as the output voltage (D) is raised to a first voltage level, and when the setting signal (C) is logic 1, the logic output signal $(L_{out})$ switches to logic 0 as the output voltage (D) is raised to a second voltage level that is greater than the first voltage level. The CPLD 82 is electrically connected to the logic operation circuit 81 for receiving the logic output signal $(L_{out})$, and is configured to generate the power control signal (L) by delaying the logic output signal $(L_{out})$ for a first preset period of time. The delay in the generation of the power control signal (L) by the CPLD 82 is to allow the multi-node server to maintain an overall power consumption in order to meet the computing power demand of the multi-node server. Details of interactions between the CPLDs 82 of multiple node motherboards 2 will be described in later part of this disclosure.

In this embodiment, the first reference voltage (V1) and the second reference voltage (V2) are both exemplified as 0.4 V. Referring to FIG. 2 and looking at a part of the timing diagram where the setting signal (C) is logic 0, the upper limit of power is the first power limit (i.e., 500 W). When the power consumption of the processing module 5 rises to the first power limit, the operating current from the power supply unit 1 rises to a level that corresponds to the first power limit (hereinafter referred to as "a first current level"). When the operating current rises to the first current level, the output voltage (D) rises to 3.58 V (the first voltage level in this embodiment) correspondingly. As the output voltage (D) rises to 3.58 V, the first voltage (D1) and the second voltage (D2) rise to 0.431 V and 0.32 V respectively. At this point, since 0.431 V is higher than 0.4 V, the first logic signal (G) that is outputted by the first comparator (OP1) is logic 1, and since 0.32 V is lower than 0.4 V, the second logic signal (H) that is outputted by the second comparator (OP2) is logic 1. In $L_{out}$=H & !(G & !C), where C=0, G=1, and H=1, the logic level of the logic output signal $(L_{out})$ generated by the logic operation circuit 81 is logic 0. When the logic level of the logic output signal $(L_{out})$ switches from logic 1 to logic 0, the CPLD 82 switches the power control signal (L) generated therefrom from the non-power suppressing logic level to the power suppressing logic level after delaying the logic output signal $(L_{out})$ for the first preset period of time. Now, looking at another part of the timing diagram where the setting signal (C) is logic 1, the upper limit of power is the second power limit (i.e., 600 W). When the power consumption of the processing module 5 rises to the second power limit, the operating current from the power supply unit 1 rises to a level that corresponds to the second power limit (hereinafter referred to as "a second current level"). When the operating current rises to the second current level, the output voltage (D) rises to 4.63 V (the second logic level in this embodiment) correspondingly. As the output voltage (D) rises to 4.63 V, the first voltage (D1) and the second voltage (D2) rise to 0.557 V and 0.42 V, respectively. At this point, since 0.557 V is higher than 0.4 V, the first logic signal (G) that is outputted by the first comparator (OP1) is logic 1, and since 0.42 V is greater than 0.4 V, the second logic signal (H) that is outputted by the second comparator (OP2) is logic 0. In $L_{out}$=H &! (G &!C), where C=1, G=1, and H=0, the logic level of the logic output signal $(L_{out})$ generated by the logic operation circuit 81 is logic 0. When the logic level of the logic output signal $(L_{out})$ switches from logic 1 to logic 0, the CPLD 82 switches the power control signal (L) generated therefrom from the non-power suppressing logic level to the power suppressing logic level after delaying the logic output signal $(L_{out})$ for the first preset period of time.

The processing module 5 is electrically connected to the logic unit 8 for receiving the power control signal (L) therefrom. The processing module 5 is configured to reduce the power consumption of the processing module 5 in order to reduce the operating current when the power consumption of the processing module 5 is so high that the operating current makes the output voltage (D) increase to a level causing the first logic signal (G), the second logic signal (H) and the setting signal (C) to cooperatively prompt the power control signal (L) received by the processing module 5 to be at the power suppressing logic level. For example, when the upper limit of power is the first power limit and the operating current received by the processing module 5 from the power supply unit 1 increases to a level that causes the first voltage (D1) to become greater than the first reference voltage (V1) due to the increase in the power consumption of the processing module 5, the power control signal (L) switches to the power suppressing logic level to trigger the processing module 5 to reduce the power consumption, thereby reducing the operating current.

The processing module 5 includes a step-down voltage converter 51 that is electrically connected to the power switch unit 3, a central processing unit (CPU) 52 that is electrically connected to the step-down voltage converter 51 and the logic unit 8, and a graphic processing unit (GPU) 53 that is electrically connected to the power switch 3 and the logic unit 8. The step-down voltage converter 51 is configured to reduce a voltage received from the power switch unit 3, and to supply the voltage thus reduced to the CPU 52. Each of the CPU 52 and the GPU 53 is configured to adjust a power consumption thereof based on the power control signal (L) received from the logic unit 8. The CPU 52 includes an overheat protection pin 54 that is electrically connected to the logic unit 8 for receiving the power control signal (L) therefrom. The GPU 53 includes an overcurrent protection pin 55 that is electrically connected to the logic unit 8 also for receiving the power control signal (L) therefrom. In specific, when the overheat protection pin 54 and the overcurrent protection pin 55 individually receive the power control signal (L) that is at the power suppressing logic level from the logic unit 8, a thermal trip event occurs, in which the overheat protection pin 54 and the overcurrent protection pin 55 respectively trigger the CPU 52 and the GPU 53 to reduce the power consumptions of the CPU 52 and the GPU 53 by, for example, lowering the operating frequency of the CPU 52 and the GPU 53, but this disclosure is not limited in this respect. It should be noted that a way of reducing the power consumptions of the CPU 52 and the GPU 53 is by reducing the operating current that is drawn by the CPU 52 and the GPU 53 from the power supply unit 1, and is not by completely cutting off the operating current from the power supply unit 1. In some embodiments, the CPU 52 may send, in an overheat event where the rise in power consumption causes a temperature of the CPU 52 to rise to a level that triggers the CPU 52, a signal to the CPLD 82 for the CPLD 82 to carry out follow-up actions such as sending a trip signal to a baseboard management controller (BMC) of the node motherboard 2 to record the overheat event in a system event log. The CPLD 82 may also communicate with the CPLDs 82 respectively of other node motherboards 2 (not shown) to coordinate the thermal trip events of the node motherboards 2, respectively. For example, in an embodiment that is exemplified by a 2U 4Nodes server (i.e., four node motherboards occupying two rack units of space), the CPLDs 82 of the four node motherboards 2 may be electrically connected to each other through a general purpose input/output (GPIO) or a System Management Bus (SMBus), and it is not limited to such. The CPLDs 82 respectively of the four node motherboards 2 may communicate with each other to allow two of the four node motherboards 2 to operate in the first current level or the second current level, or to delay the thermal trip events respectively of the two of the four node motherboards 2, while the remaining two of the four node motherboards 2 both operate in the operating current at a minimum operating current level when a thermal trip event occurs. This setting allows the multi-node server to maintain an overall power consumption that does not cause overheat or overcurrent.

Referring to FIG. 2, in this embodiment, when the setting signal (C) is logic 0 (i.e., the upper limit of power is 500 W), and the power control signal (L) switches from logic 1 to logic 0, the overheat protection pin 54 of the CPU 52 and the overcurrent protection pin 55 of the GPU 53 respectively trigger the CPU 52 and the GPU 53 to reduce the power consumptions thereof. When the power consumptions of the CPU 52 and the GPU 53 decrease, the operating current drawn from the power supply unit 1 decreases. When the operating current from the power supply unit 1 decreases, the voltage VR within the power switch unit 3 decreases, which causes the supply voltage (E) to increase, and the output voltage (D) to decrease. The output voltage (D) may continue to decrease until the operating current reaches the minimum operating current level. In the illustrative embodiment, the output voltage (D) is at 2.15 V when the operating current reaches the minimum operating current level. As the output voltage (D) decreases, the first voltage (D1) and the second voltage (D2) also decrease. When the first voltage (D1) and the second voltage (D2) both decrease to a voltage level below 0.4 V, the first logic signal (G) switches from logic 1 to logic 0 and the second logic signal (H) remains at logic 1. In $L_{out}$=H & !(G & !C), where C=0, G=0, and H=1, the logic level of the logic output signal ($L_{out}$) generated by the logic operation circuit 81 is logic 1. When the logic level of the logic output signal ($L_{out}$) switches from logic 0 to logic 1, the power control signal (L) generated by the CPLD 82 consequently switches from the power suppressing logic level to the non-power suppressing logic level after delaying the logic output signal ($L_{out}$) for a second preset period of time. The second preset period of time is determined by the time taken for a thermal value of the processing module 5 to return to the thermal value that corresponds to the power consumption, when the CPU 52 and the GPU 53 are operating at the normal operating state (hereinafter referred to as "normal thermal value") after the thermal value of the processing module 5 is caused to increase due to an increase in the power consumption of the processing module 5. When the power control signal (L) switches from the power suppressing logic level to the non-power suppressing logic level, the overheat protection pin 54 of the CPU 52 and the overcurrent protection pin 55 of the GPU 53 respectively stop triggering the CPU 52 and the GPU 53 to reduce power consumptions. Consequently, the operating current rises back to a level that corresponds to the normal operating state of the processing module 5. For example, when the setting signal (C) is logic 0 (i.e., the upper limit of power is 500 W), the change in the operating current may be from 50 milliamperes (mA) (i.e., the level at the normal operating state), to 100 mA (i.e., the first current level), to 10 mA (i.e., the minimum operating current level) and back to 50 mA (i.e., the level at the normal operating state), in which the operating current reduces from 100 mA to 10 mA when the power control signal (L) switches from logic 1 to logic 0. Now, when the setting signal (C) is logic 1 (i.e., the upper limit of power is 600 W), and the power control signal (L) switches from logic 1 to logic 0, the overheat protection pin 54 of the CPU 52 and the overcurrent protection pin 55 of the GPU 53 may respectively trigger the CPU 52 and the GPU 53 to reduce power consumptions of the CPU 52 and the GPU 53. Consequently, the operating current from the power supply unit 1 may start to decrease, causing the supply voltage (E) to increase and the output voltage (D) to decrease. In the illustrative embodiment, when the operating current decreases to the minimum operating current level, the output voltage (D) decreases to 2.15 V, causing the first voltage (D1) and the second voltage (D2) to also decrease. When the first voltage (D1) and the second voltage (D2) both are lower than 0.4 V, the first logic signal (G) switches from logic 1 to logic 0 and the second logic signal (H) switches from logic 0 to logic 1. In $L_{out}$=H & !(G & !C), where C=1, G=0, and H=1, the logic level of the logic output signal ($L_{out}$) generated by the logic operation circuit 81 is logic 1. When the logic level of the logic output signal ($L_{out}$) switches from logic 0 to logic 1, the power control signal (L) generated by the CPLD 82 switches from the power suppressing logic level to the non-power suppressing logic level after delaying the logic output signal ($L_{out}$) for a third preset period of time. The third preset period of time is also determined by the time that is taken for the thermal value of the processing module 5 to return to the normal thermal value after the thermal value of the processing module 5 is caused to increase due to the increase in the power consumption of the processing module 5. This time, as the setting signal (C) is logic 1, the second power limit is higher than the first power limit, and the power consumption of the processing module 5 may be higher compared to when the setting signal (C) is logic 0. Hence, the thermal value of the processing module 5 may be higher and need longer duration of time for the thermal value to return to the normal thermal value. Therefore, the third preset period of time is longer than the second preset period of time. When the power control signal (L) switches from the power suppressing logic level to the non-power suppressing logic level, the overheat protection pin 54 of the CPU 52 and the overcurrent protection pin 55 of the GPU 53 respectively stop triggering the CPU 52 and the GPU 53 to reduce the power consumptions, and the operating current rises back to the level that corresponds to the normal operating state.

Figure 3:
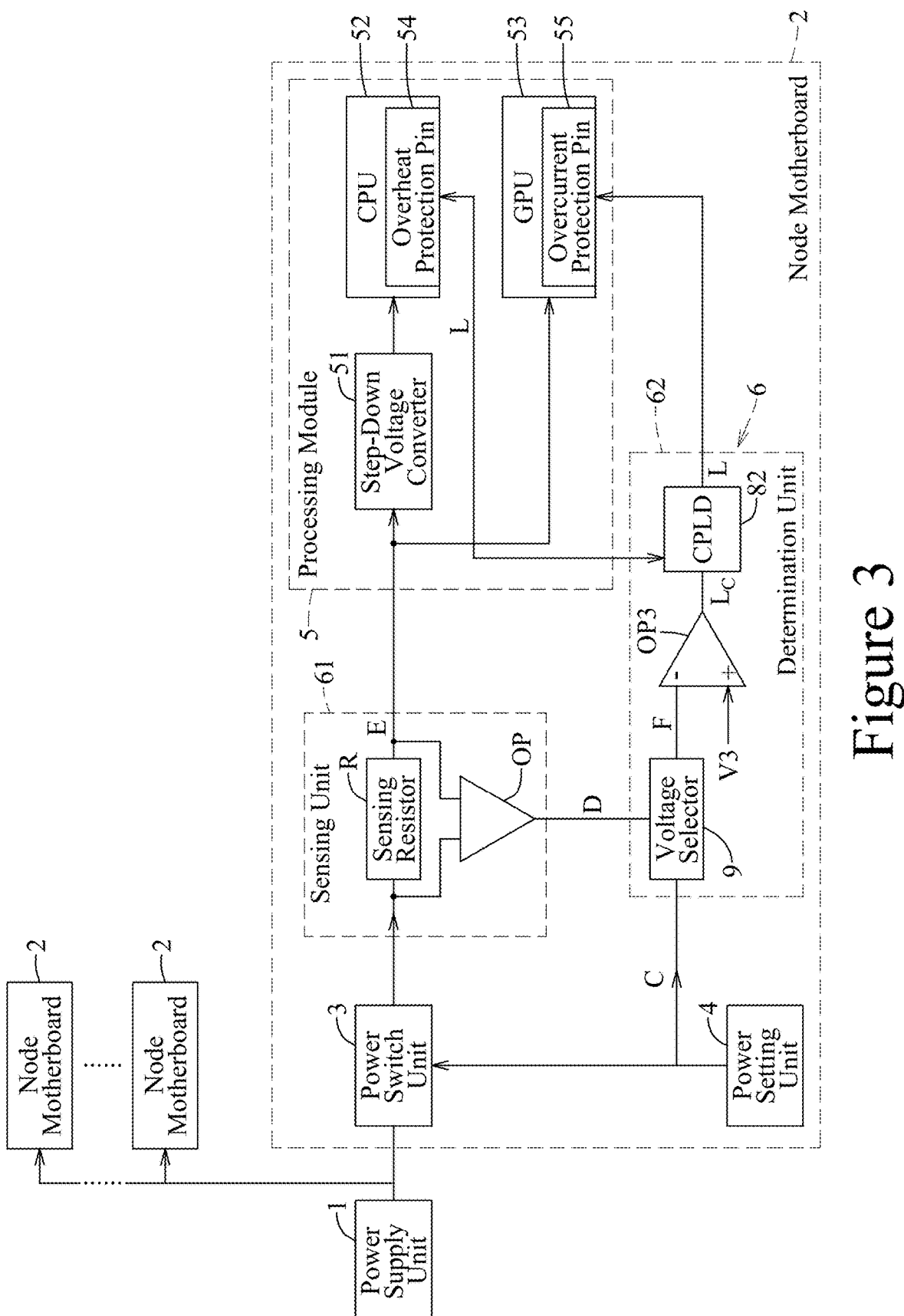
FIG. 3 is a block diagram illustrating a second embodiment of a multi-node server with power scaling according to the present disclosure.
Figure 4:
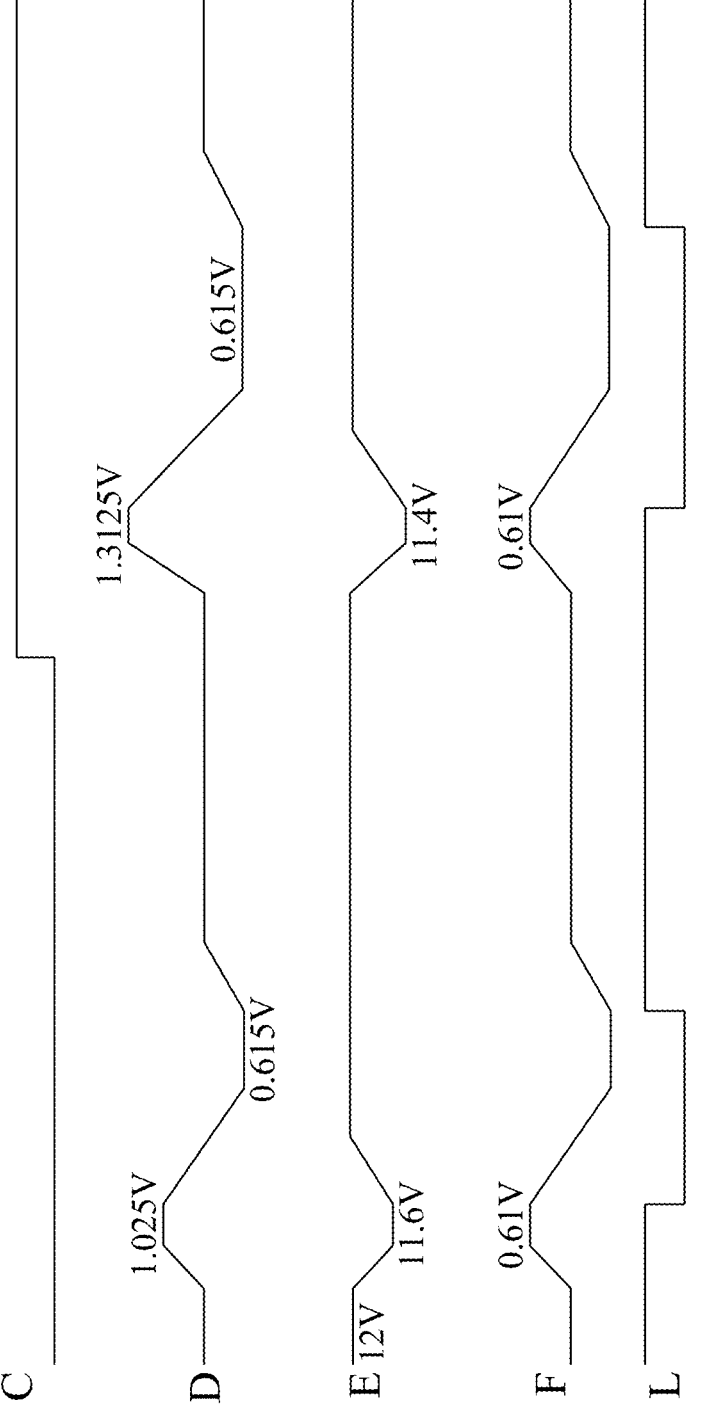
FIG. 4 is a timing diagram of operation of the second embodiment of the multi-node server according to the present disclosure.

Referring to FIGS. 3 and 4, a second embodiment of the multi-node server with power scaling according to this disclosure includes a power supply unit 1 and a plurality of node motherboards 2.

The plurality of node motherboards 2 are electrically connected to the power supply unit 1, and each receives an operating current from the power supply unit 1. Each of the plurality of node motherboards 2 includes a power switch unit 3, a protection module 6, a processing module 5, and a power setting unit 4. The node motherboards 2 of the second embodiment are similar to the node motherboards 2 of the first embodiment, and differ from those of the first embodiment in that the protection modules 6 in the second embodiment have different configurations from the protection modules 6 in the first embodiment.

In the second embodiment, the protection module 6 includes a sensing unit 61 and a determination unit 62. The sensing unit 61 is electrically connected between the power switch unit 3 and the processing module 5. Specifically, the sensing unit 61 is electrically connected to the step-down voltage converter 51 of the processing module 5, and to the GPU 53 of the processing module 5. The sensing unit 61 is configured to sense changes in the operating current and to generate an output voltage (D) that is positively correlated with the operating current. In specific, the sensing unit 61 includes a sensing resistor (R) that has two ends opposite to each other and connected between the power switch unit 3 and the processing module 5, and an operational amplifier (OP) that has two inputs electrically connected respectively to the two ends of the sensing resistor (R). The sensing resistor (R) is configured to produce a potential difference across the sensing resistor (R) when the operating current passes through the sensing resistor (R). The operational amplifier (OP) is configured to receive and amplify the potential difference across the sensing resistor (R) to generate the output voltage (D). Since the potential difference across the sensing resistor (R) is directly proportional to the operating current that passes through the sensing resistor (R), and the output voltage (D) is generated by amplifying the potential difference across the sensing resistor (R), the output voltage (D) is positively correlated with the potential difference across the sensing resistor (R) and the operating current.

The determination unit 62 is electrically connected to the sensing unit 61 for receiving the output voltage (D) therefrom. The determination unit 62 is configured to receive the setting signal (C) from the power setting unit 4, to generate a select voltage (F) based on the output voltage (D) and the setting signal (C), and to compare the select voltage (F) with a third reference voltage (V3) to generate a power control signal (L) that switches between a power suppressing logic level and a non-power suppressing logic level. The select voltage (F) is positively correlated with the output voltage (D).

The determination unit 62 includes a voltage selector 9, a third comparator (OP3), and a CPLD 82. The voltage selector 9 is electrically connected to the power setting unit 4 for receiving the setting signal (C). The voltage selector 9 is further electrically connected to the operational amplifier (OP) for receiving the output voltage (D), and is configured to divide the output voltage (D) and to generate a third voltage and a fourth voltage. The voltage selector 9 is further configured to select, based on the setting signal (C), one of the third voltage and the fourth voltage to be the select voltage (F). In specific, for each of the plurality of node motherboards 2, the voltage selector 9 selects the third voltage to be the select voltage (F) when the setting signal (C) sets the upper limit of power to be consumed by the node motherboard 2 to the first power limit, and selects the fourth voltage to be the select voltage (F) when the setting signal (C) sets the upper limit of power to be consumed by the node motherboard 2 to the second power limit. In this embodiment, the fourth voltage is smaller than the third voltage.

The third comparator (OP3) has an inverting input that is electrically connected to the voltage selector 9 for receiving the select voltage (F), a non-inverting input for receiving the third reference voltage (V3), and an output for outputting a compare signal ($L_c$).

The CPLD 82 is electrically connected to the third comparator (OP3) for receiving the compare signal ($L_c$) therefrom. The CPLD 82 is configured to generate the power control signal (L) by delaying the compare signal ($L_c$) for the first preset period of time.

The determination unit 62 is further electrically connected to the processing module 5 for transmitting the power control signal (L) to the processing module 5. The processing module 5 is configured to reduce the power consumption of the processing module 5 in order to reduce the operating current when the power consumption of the processing module 5 is so high that the operating current makes the output voltage (D) increase to a level that causes the select voltage (F) to prompt the power control signal (L) received from the determination unit 62 to be at the power suppressing logic level. For example, the power control signal (L) is switched to the power suppressing logic level after the operating current is increased, due to the increase in the power consumption of the processing module 5, to cause the select voltage (F) to become greater than the third reference voltage (V3).

Referring further to FIG. 4, in this embodiment, the third reference voltage (V3) is exemplified to be 0.6 V. When the setting signal (C) is logic 0 (i.e., the upper limit of power is 500 W), and the power consumption of the processing module 5 rises to the first power limit, the operating current drawn from the power supply unit 1 rises to the first current level. At the same time, the potential difference across the sensing resistor (R) rises to a level that causes a supply voltage (E) outputted from the power switch unit 3 to the processing module 5 to drop from 12 V to 11.6 V. At the same time, the output voltage (D) increases to 1.025 V (the first voltage level in this embodiment) from a normal output voltage. In this embodiment, the normal output voltage is defined as being between 0.615 V to 1.025 V when the setting signal (C) is logic 0. When the output voltage (D) is 1.025 V, the third voltage is 0.61 V. At this time, the fourth voltage is lower than the third voltage. Since the setting signal (C) is logic 0, the voltage selector 9 selects the third voltage as the select voltage (F). Since 0.61 V is greater than the third reference voltage (V3) of 0.6 V, the compare signal (L$_c$) (not shown in FIG. 4) outputted by the third comparator (OP3) switches from logic 1 to logic 0. Consequently, the power control signal (L) switches from logic 1 to logic 0 after the first preset period of time. As the power control signal (L) switches to logic 0, which is the power suppressing logic level, the overheat protection pin 54 of the CPU 52 and the overcurrent protection pin 55 of the GPU 53 respectively trigger the CPU 52 and the GPU 53 to reduce the power consumptions thereof. When the power consumptions of the CPU 52 and the GPU 53 decrease, the operating current drawn from the power supply unit 1 decreases. Consequently, the potential difference across the sensing resistor (R) decreases, which causes the supply voltage (E) to increase, and the output voltage (D) to decrease. The output voltage (D) may continue to decrease until the operating current reaches the minimum operating current level. The output voltage (D) is at 0.615 V when the operating current reaches the minimum operating current level. As the output voltage (D) decreases, the select voltage (F), which in this case is the third voltage, also decreases. When the select voltage (F) becomes lower than 0.6 V, the compare signal (L$_c$) outputted by the third comparator (OP3) switches from logic 0 to logic 1. The power control signal (L) generated by the CPLD 82 consequently switches from the power suppressing logic level to the non-power suppressing logic level after delaying for the second preset period of time. When the power control signal (L) switches from the power suppressing logic level to the non-power suppressing logic level, the operating current rises back to the level corresponding to the normal operating state. When the setting signal (C) is logic 1 (i.e., the upper limit of power is 600 W), and the power consumption of the processing module 5 rises to the second power limit, the operating current drawn from the power supply unit 1 rises to the second current level. This time, the output voltage (D) is caused to increase to 1.3125 V (the second voltage level in this embodiment). When the output voltage (D) rises to 1.3125 V, the fourth voltage is at 0.61 V. At this time, the third voltage is higher than the fourth voltage. Since the setting signal (C) is logic 1, the voltage selector 9 selects the fourth voltage as the select voltage (F). Since 0.61 V is greater than the third reference voltage (V3) of 0.6 V, the compare signal (L$_c$) outputted by the third comparator (OP3) switches from logic 1 to logic 0. Consequently, the power control signal (L) switches from logic 1 to logic 0 after the first preset period of time. When the processing module 5 receives the power control signal (L) that is the power suppressing logic level, the thermal trip event occurs. When the thermal trip event occurs and the operating current of the processing module 5 reaches the minimum operating current level, the select voltage (F) becomes lower than 0.6 V, and the compare signal (L$_c$) outputted by the third comparator (OP3) switches from logic 0 to logic 1. Consequently, the power control signal (L) switches from logic 0 to logic 1 after delaying for the third preset period of time.

Figure 5:
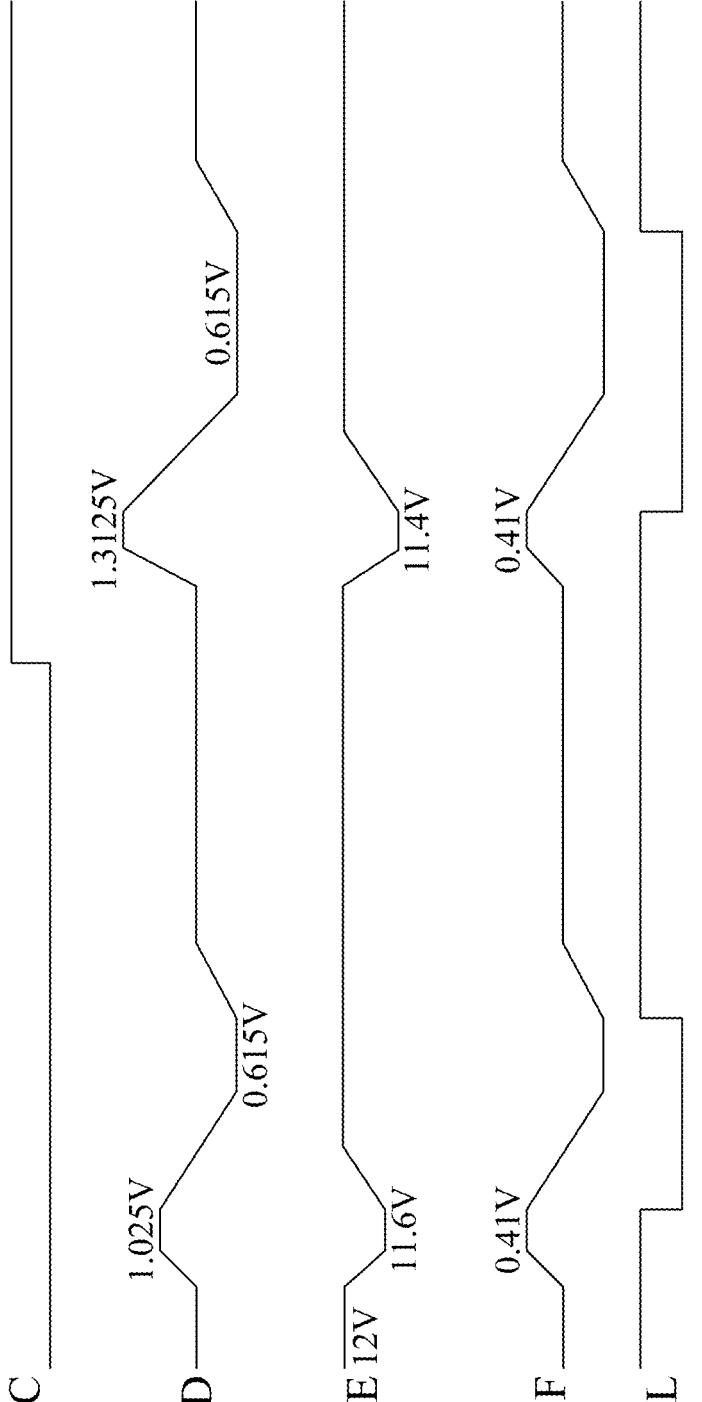
FIG. 5 is a timing diagram of operation of a variant of the second embodiment of the multi-node server according to the present disclosure.

Referring to FIG. 5, a variant of the second embodiment of this disclosure is presented, where the third reference voltage (V3) is 0.4 V instead of 0.6 V. When the power consumption of the processing module 5 rises to the first power limit, the third voltage that is selected as the select voltage (F) is 0.41 V, and when the power consumption of the processing module 5 rises to the second power limit, the fourth voltage that is selected as the select voltage (F) is 0.41 V. The rest of the operation of this variant is similar to the second embodiment and details thereof are omitted therein for the sake of brevity.

In sum, the above-mentioned embodiments of the multi-node server with power scaling are able to adjust the operating current of each node motherboard 2 individually to protect the multi-node server from shutting down due to overcurrent, effectively overcoming the insufficiency of the conventional technique.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A multi-node server with power scaling, comprising:
a power supply unit; and
a plurality of node motherboards electrically connected to
   said power supply unit and each receiving an operating current from said power supply unit, each of said plurality of node motherboards including:

a power switch unit that is electrically connected to said power supply unit for receiving the operating current therefrom, and that is configured to generate an output voltage based on the operating current received thereby, a protection module that includes a comparator unit electrically connected to said power switch unit for receiving the output voltage there-from, configured to divide the output voltage to generate a first voltage and a second voltage, wherein the first voltage is greater than the second voltage, and configured to generate a first logic signal based on the first voltage and a first reference voltage, and to generate a second logic signal based on the second voltage and a second reference voltage, and a logic unit electrically connected to said comparator unit for receiving the first logic signal and the second logic signal therefrom, and configured to receive a setting signal, and to perform a logical operation based on the first logic signal, the second logic signal, and the setting signal in order to generate a power control signal that switches between a power suppressing logic level and a non-power suppressing logic level, and a processing module that is electrically connected to said power switch unit for receiving the operating current therefrom, that is electrically connected to said logic unit for receiving the power control signal therefrom, that has a power consumption positively correlated with the operating current, and that is configured to reduce the power consumption of said processing mod-ule in order to reduce the operating current when the power consumption of said processing module reaches or exceeds an upper limit causing the first logic signal, the second logic signal and the setting signal to coop-eratively prompt the power control signal received by said processing module to be at the power suppressing logic level;

wherein said processing module includes a step-down voltage converter electrically connected to said power switch unit, and a central processing unit (CPU) elec-trically connected to said step-down voltage converter and said logic unit.

2. The multi-node server with power scaling as claimed in claim 1, wherein the first reference voltage is equal to the second reference voltage, and the operating current received by said power switch unit from said power supply unit is positively correlated with the output voltage that is gener-ated by said power switch unit.

3. The multi-node server with power scaling as claimed in claim 1, wherein said comparator unit includes a first voltage divider that is configured to divide the output voltage and to generate the first voltage, and a first comparator that has a non-inverting input electrically connected to said first volt-age divider for receiving the first voltage, an inverting input for receiving the first reference voltage, and an output for outputting the first logic signal; and wherein the first logic signal is logic 1 when the first voltage is greater than the first reference voltage, and the first logic signal is logic o when the first voltage is smaller than the first reference voltage.

4. The multi-node server with power scaling as claimed in claim 3, wherein said comparator unit further includes a second voltage divider that is configured to divide the output voltage and to generate the second voltage, and a second comparator that has an inverting input electrically connected to said second voltage divider for receiving the second voltage, a non-inverting input for receiving the second reference voltage, and an output for outputting the second logic signal; and wherein the second logic signal is logic o when the second voltage is greater than the second reference voltage, and the second logic signal is logic 1 when the second voltage is smaller than the second reference voltage.

5. The multi-node server with power scaling as claimed in claim 4, wherein each of said plurality of node motherboards further includes a power setting unit configured to generate the setting signal that indicates the upper limit of power to be consumed by said node motherboard.

6. The multi-node server with power scaling as claimed in claim 5, wherein said logic unit includes a logic operation circuit that is electrically connected to said power setting unit for receiving the setting signal, that is electrically connected to said first comparator for receiving the first logic signal, that is electrically connected to said second comparator for receiving the second logic signal, and that is configured to generate a logic output signal according to: $L_{out}=H\&!(G\&!C)$, where $L_{out}$ represents a logic level of the logic output signal, G represents a logic level of the first logic signal, H represents a logic level of the second logic signal, C represents a logic level of the setting signal, ! denotes a NOT operation, and & denotes an AND operation.

7. The multi-node server with power scaling as claimed in claim 6, wherein said logic unit further includes a complex programmable logic device (CPLD) that is electrically con-nected to said logic operation circuit for receiving the logic output signal, and that is configured to generate the power control signal by delaying the logic output signal for a preset period of time.

8. The multi-node server with power scaling as claimed in claim 6, wherein, for each of said plurality of node moth-erboards, the upper limit of power to be consumed by said node motherboard is set to a first power limit when the setting signal is at logic 0, and is set to a second power limit that is greater than the first power limit when the setting signal is at logic 1;

wherein, when the setting signal is at logic 0, the logic output signal switches to logic 0 as the output voltage is raised to a first voltage level; and wherein, when the setting signal is at logic 1, the logic output signal switches to logic 0 as the output voltage is raised to a second voltage level that is greater than the first voltage level.

9. The multi-node server with power scaling as claimed in claim 1, wherein the power control signal switches to the power suppressing logic level after the operating current received from said power supply unit is increased, due to an increase in the power consumption of said processing mod-ule, to cause the first voltage to become greater than the first reference voltage.

10. The multi-node server with power scaling as claimed in claim 1, wherein said processing module includes a graphic processing unit (GPU) electrically connected to said power switch and said logic unit;

wherein said step-down voltage converter is configured to reduce a voltage received from said power switch unit, and to supply the voltage thus reduced to said CPU; and wherein each of said CPU and said GPU is configured to adjust a power consumption thereof based on the power control signal received from said logic unit.

* * * * *